J. W. GREENE.
TRAVELING HOBBY HORSE.
APPLICATION FILED JUNE 15, 1914.
1,137,604.
Patented Apr. 27, 1915.
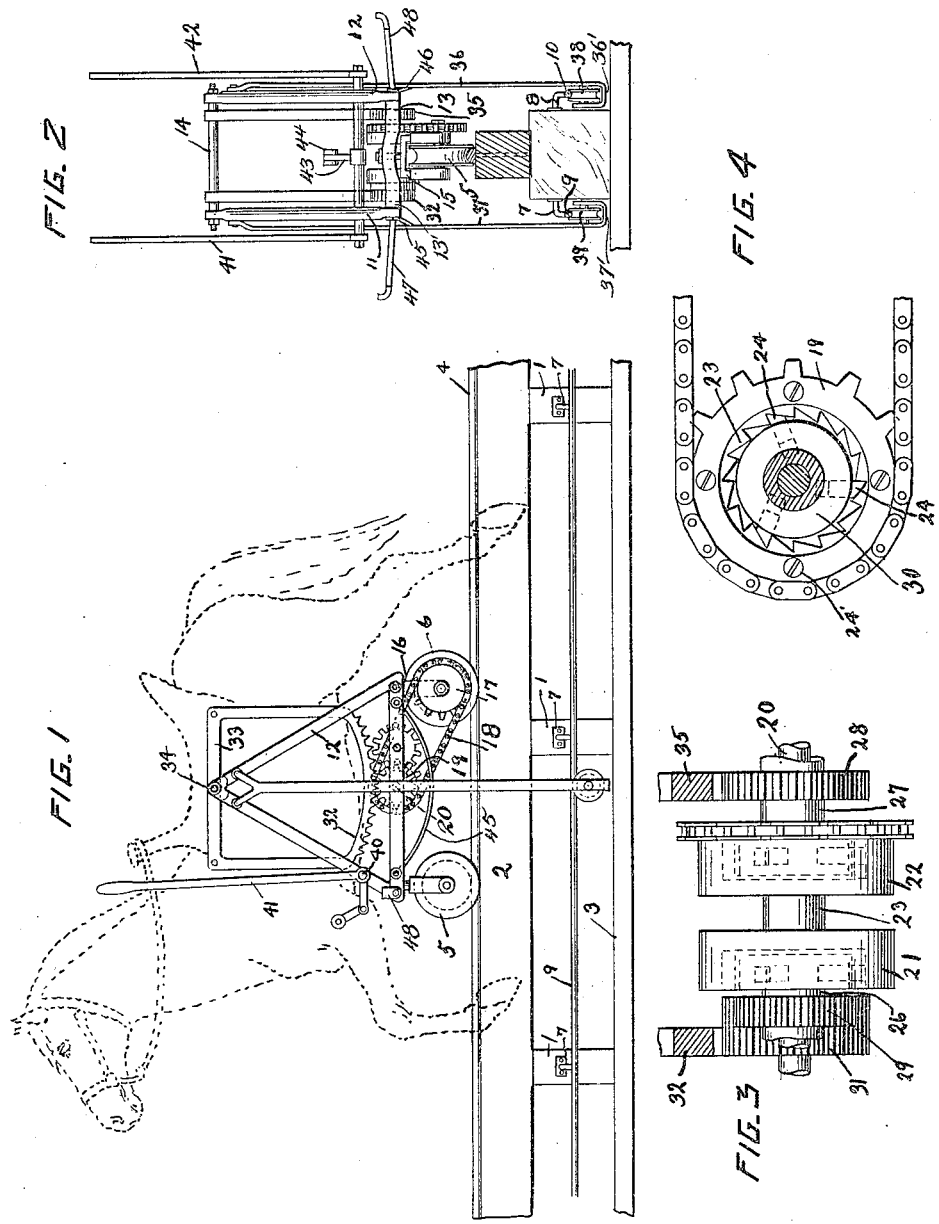
WITNESSES:
F. B. Griffin
Léon Boillot
INVENTOR.
J. W. GREENE
BY
Carlos P. Griffin ATTORNEY

UNITED STATES PATENT OFFICE.

JOHN W. GREENE, OF SAN FRANCISCO, CALIFORNIA, ASSIGNOR TO AMUSE-U-RIDING DEVICE CO., A CORPORATION OF CALIFORNIA.

TRAVELING HOBBY-HORSE.

1,137,604.   Specification of Letters Patent.   Patented Apr. 27, 1915.

Application filed June 15, 1914. Serial No. 845,108.

*To all whom it may concern:*

Be it known that I, JOHN W. GREENE, a citizen of the United States, residing at San Francisco, in the county of San Francisco, State of California, have invented a new and useful Traveling Hobby-Horse, of which the following is a specification in such full and clear terms as will enable those skilled in the art to construct and use the same.

This invention relates to a traveling hobby horse and its object is to produce a device which the rider can cause to travel along a fixed track.

An object of the invention is to provide means whereby the rider can rock the horse, which rocking motion will cause the horse to travel forward.

A further object of the invention is to provide means whereby the wheel frame supporting the horse may travel around a curved track without being liable to derailment.

An embodiment of the invention is shown in the drawing in which the same reference numeral is applied to the same portion throughout, but I am aware that there are many modifications thereof.

Figure 1 is a side elevation of the track and wheel frame, the hobby horse being indicated in dotted lines, Fig. 2 is an end elevation of the frame work supporting the hobby horse, the track being shown in section, Fig. 3 is a view in elevation of the driving wheels and clutches, and Fig. 4 is a side elevation of the driving sprockets illustrating one of the clutches used in connection therewith.

The numeral 1 represents a plurality of posts on which the stringer 2 is mounted, the post being supported on a suitable floor or foundation 3. On the stringer 2 there is a half round rail 4 forming the track.

The carriage is provided with front and rear grooved wheels 5 and 6, the front wheel being mounted in a caster frame 15 to enable the carriage to travel around a curved track.

The posts 1 support brackets 7 and 8 on opposite sides thereof, which brackets carry rails 9 and 10.

The carriage forming the support for the figure shown in dotted lines comprises two triangular frames 11 and 12 connected at the top by means of the rod 14, transverse braces 13 and 13' connecting the lower corners of the triangular frames and affording the means for supporting the carriage on the wheel forks 15 and 16.

The carriage is intended to be driven forward upon each movement of the rocking horse. This is accomplished by applying a sprocket wheel 17 to the rear wheel 6. A chain 18 passes around the wheel 17 and around a wheel 19 on the shaft 20. The wheel 19 is secured to a sleeve 27 which has the gear 28 and the boss 30 connected therewith, said boss having a plurality of pawls 24 in slots therein. Adjacent the pawl boss on the shaft 20 is a sleeve 23 which has a clutch member 21 overlying the pawls on the sleeve 26 and a second clutch 22 overlying the pawl boss on the sleeve 27, it being understood that each clutch member is substantially a duplicate of the other, one being right-handed and the other being left-handed.

The sleeve 26 has a gear 29 connected therewith, which gear is in mesh with a wider gear 31, just at the back thereof and larger than the gear 29.

The gears 28 and 31 are so placed as to mesh with the racks 35 and 32 on the movable frame 33, said frame being pivotally supported at 34 at the top of the frames 11 and 12.

The sprocket wheel 19 is secured on the side of the clutch 22 by the screws 24'.

The horse is rocked back and forth by means of two levers 41 and 42 connected with the ends of the transverse shaft 40, said shaft carrying a short lever 43 near the center thereof, which lever is connected to the horse by means of the link 44.

The carriage is held upright by means of the depending side bars 36 and 37. These bars are connected with the top of the frames 11 and 12 and are braced at their middle portions by rods 45 and 46, the ends of which are connected at front and rear with the lower portions of the frames 11 and 12.

In order to provide a foot support for the rider stirrup brackets 47 and 48 are connected with the forward lower portions of the frames 11 and 12.

The lower ends of the bars 36 and 37 are provided with in-turned hooks as indicated at 36' and 37' to form bearings for the journals of the rollers 38 and 39, which rollers lie below the rails 9 and 10 and hold the carriage upright.

In use the rider mounts the horse and placing the feet on the stirrup brackets proceeds to work the horse back and forth with the hand levers. The rack 35 will then drive the gear 28 direct while the rack 32 will drive the gear 29 reversely on the same movement, but upon reversing the direction of movement of the horse the carriage will be driven in the same direction as the movement previously imparted thereto.

Having thus described my invention what I claim as new and desire to secure by Letters Patent of the United States, is as follows, modifications within the scope of the claims being expressly reserved:

1. A hobby horse comprising a wheeled frame, a sprocket wheel carried by one of said wheels, a sprocket wheel on the wheeled frame, a chain passing around both of said sprocket wheels, a rocking frame having means to deliver power to the sprocket chain, to drive the hobby horse forward, and a hand lever for rocking the horse to cause the forward travel thereof.

2. In a hobby horse, a frame, wheels for supporting said frame, a rocking frame supported in the first frame and carrying a figure, means to drive one of the supporting wheels in one direction from the rocking frame, a pivoted shaft, a hand lever connected therewith, and a link connected with the figure for rocking one of said frames to drive the figure forward.

3. In a hobby horse, a frame, wheels in a single plane supporting said frame, side braces to hold the frame upright, a sprocket wheel carried by one of the supporting wheels, a second sprocket wheel on the frame, a sprocket chain passing around the sprocket wheels, a second frame pivoted in the first frame, means operated by said second frame to cause the travel of the sprocket chain in one direction regardless of the direction of movement of said pivoted chain, and a hand lever at each side of the frame for rocking the figure and pivoted frame to drive the hobby horse forward.

In testimony whereof I have hereunto set my hand this 20th day of May, A. D. 1914, in the presence of the two subscribed witnesses.

JOHN W. GREENE.

Witnesses:
A. H. KEPHART,
HENRY B. LISTER.

Copies of this patent may be obtained for five cents each, by addressing the "Commissioner of Patents, Washington, D. C."